United States Patent
Palaksha

(10) Patent No.: US 12,518,281 B2
(45) Date of Patent: Jan. 6, 2026

(54) METHOD, APPARATUSES AND SYSTEM FOR AUTHORIZING A THIRD PARTY

(71) Applicant: Infineon Technologies AG, Neubiberg (DE)

(72) Inventor: Vijaykumar Palaksha, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 700 days.

(21) Appl. No.: 17/382,930

(22) Filed: Jul. 22, 2021

(65) Prior Publication Data

US 2022/0027922 A1 Jan. 27, 2022

(30) Foreign Application Priority Data

Jul. 23, 2020 (EP) ..................................... 20187485

(51) Int. Cl.
*G06Q 20/40* (2012.01)
*G06Q 20/10* (2012.01)
*H04L 9/08* (2006.01)
*H04L 9/32* (2006.01)

(52) U.S. Cl.
CPC ... *G06Q 20/40145* (2013.01); *G06Q 20/1085* (2013.01); *H04L 9/0866* (2013.01); *H04L 9/3231* (2013.01); *G06Q 2220/00* (2013.01); *H04L 2209/56* (2013.01)

(58) Field of Classification Search
CPC ......... G06Q 20/40145; G06Q 20/1085; G06Q 2220/00; H04L 9/0866; H04L 9/3231; H04L 2209/56
See application file for complete search history.

(56) References Cited

U.S. PATENT DOCUMENTS 8,214,257 B1* 7/2012 Folk ................... G06Q 20/2295
705/16
10,154,029 B1* 12/2018 Griffin .................... H04L 63/06
10,735,191 B1* 8/2020 Khaleghi ................ H04L 9/088
(Continued)

FOREIGN PATENT DOCUMENTS

GB 2492050 A 12/2012
WO 2018156067 A1 8/2018
WO 2019094071 A1 5/2019

OTHER PUBLICATIONS

Ed Dawson et al., BAAI: Biometric Authentication and Authorization Infrastructure, Mar. 8, 2004, IEEE, pp. 274-278 (Year: 2004).*

*Primary Examiner* — Nilesh B Khatri

(74) *Attorney, Agent, or Firm* — Murphy, Bilak & Homiller, PLLC

(57) ABSTRACT

A method for authorizing a third party includes performing, at a first entity, obtaining a biometric feature of the third party, obtaining a secret value and combining the biometric feature and the secret value so as to obtain a combined secret value. The method further includes performing, at an access controller, receiving the secret value, receiving the combined secret value and processing the combined secret value using the secret value so as to obtain a decoded biometric feature. The method further includes obtaining a biometric feature to be verified, comparing the decoded biometric feature with the biometric feature to be verified so as to obtain a comparison result, and authorizing the third party based on the comparison result.

12 Claims, 5 Drawing Sheets

(56) References Cited

U.S. PATENT DOCUMENTS

| | | | |
|---|---|---|---|
| 11,588,813 B2* | 2/2023 | Bhatt | H04L 63/0853 |
| 2007/0067642 A1* | 3/2007 | Singhal | G07C 9/257 |
| | | | 713/186 |
| 2010/0274688 A1* | 10/2010 | Hammad | G06Q 20/40 |
| | | | 705/325 |
| 2012/0078638 A1* | 3/2012 | Novack | H04L 63/0861 |
| | | | 704/E17.001 |
| 2015/0227931 A1 | 8/2015 | Genovez | |
| 2017/0070497 A1* | 3/2017 | McCallum | H04L 9/3231 |
| 2017/0359180 A1* | 12/2017 | Choi | H04L 9/3263 |
| 2018/0234414 A1* | 8/2018 | Littrell | G06F 21/33 |
| 2020/0195635 A1* | 6/2020 | Shimrit | G06F 21/31 |
| 2021/0081937 A1* | 3/2021 | Yaqub | G06Q 20/40145 |

\* cited by examiner

METHOD, APPARATUSES AND SYSTEM FOR AUTHORIZING A THIRD PARTY

TECHNICAL FIELD

The present disclosure is related to a method, to apparatuses and to a system for authorizing a third party. The present disclosure is further related to an implementation of fingerprint based third party cardless cash withdrawal.

BACKGROUND

Cardless third party cash withdrawal in automated teller machines (ATM) with a single factor authentication, i.e., using a One-Time-Password (OTP) allows to dispense money on behalf of the account holder by a third party.

There is a need to securely perform cash withdrawal. This need expands to a need for securely accessing an account, a right or a permission by a third party on behalf of an owner or the like.

SUMMARY

According to an embodiment, a method for authorizing a third party comprises steps being performed at a first entity and steps performed at an access controller. At the first entity, the method comprises obtaining a biometric feature of the third party, obtaining a secret value and combining the biometric feature and the secret value so as to obtain a combined secret value. At the access controller, the secret value is received. Further, the combined secret value is received. The combined secret value is processed using the secret value so as to obtain a decoded biometric feature. The method further comprises obtaining a biometric feature to be verified, comparing the decoded biometric feature with the biometric feature to be verified so as to obtain a comparison result authorizing the third party based on the comparison result.

According to an embodiment, an apparatus comprises an input interface configured for obtaining a biometric feature of a third party and for obtaining a secret value. The apparatus comprises a calculation unit configured for combining the biometric feature and the secret value so as to obtain a combined secret value. The apparatus comprises a control unit configured for transmitting the combined secret value so as to authorize a person associated with the biometric feature, e.g., the third party.

According to an embodiment, an apparatus comprises an input interface configured for obtaining a secret value and for obtaining a combined secret value. The apparatus comprises an interface for receiving information indicating a biometric feature. The apparatus comprises a calculation unit configured for processing the combined secret value using the secret value so as to obtain a decoded biometric feature and for comparing the decoded biometric feature with the biometric feature so as to obtain a comparison result. The apparatus comprises a control unit configured for authorizing a user of the apparatus for a service provided by the apparatus based on the comparison result.

Further embodiments relate to a system comprising the described apparatuses. According to an embodiment, a non-transitory computer readable digital storage medium has stored a computer program for preforming a described method.

BRIEF DESCRIPTION OF THE DRAWINGS

Embodiments of the present disclosure will be described in more detail whilst making reference to the accompanying drawings in which.

DETAILED DESCRIPTION

Figure 1:
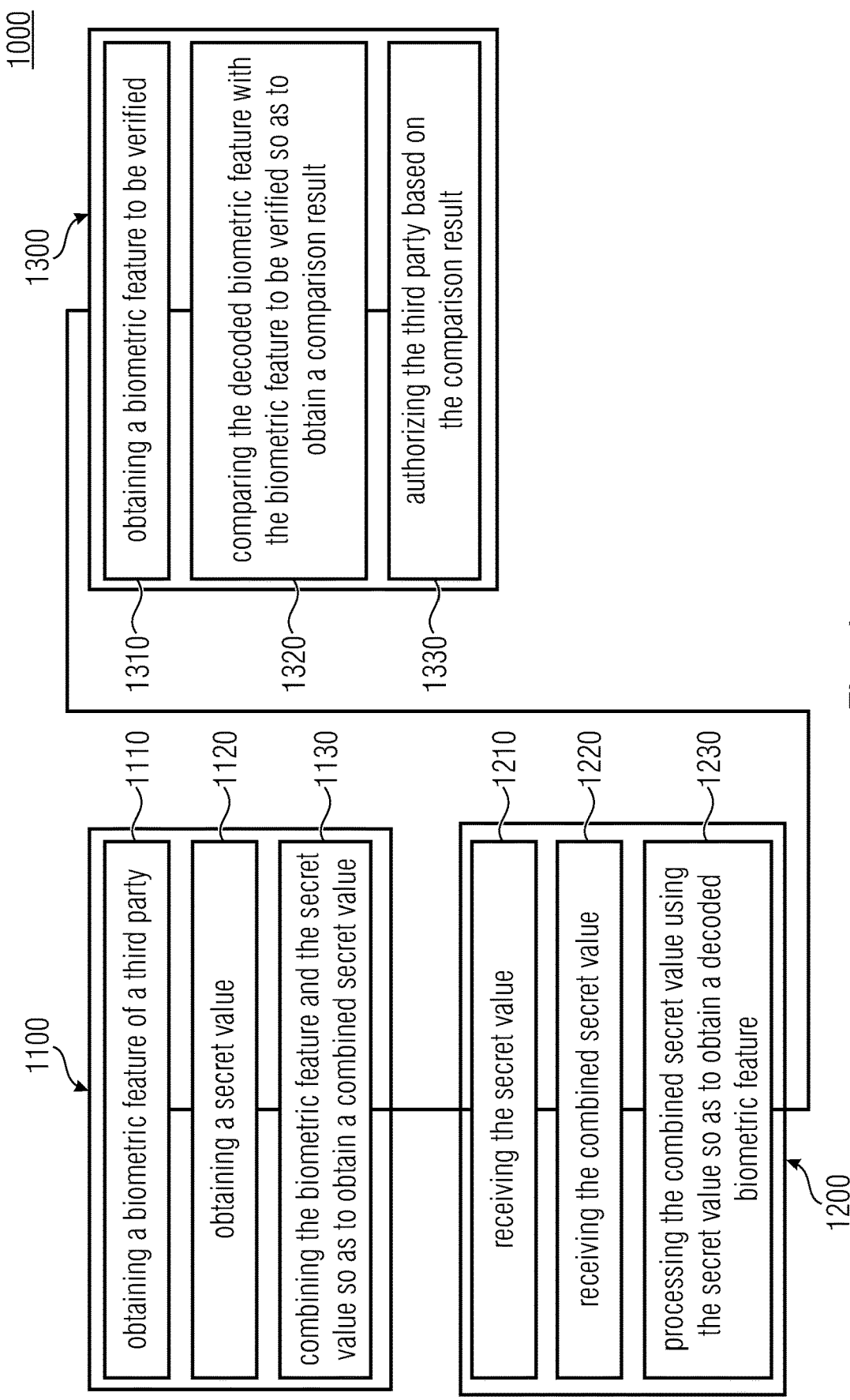
FIG. 1 shows a schematic block diagram of a method according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to authorizing a third party by verifying a biometric feature. Embodiments described herein relate to a fingerprint as an illustrative example for a biometric feature. However, embodiments of the present disclosure are not limited to use a fingerprint as a biometric feature. Additional and/or different biometric features may be used, for example, a face being scanned or processed by use of face recognition, an iris of an eye or the like. This includes combinations of biometric features.

Embodiments described herein relate to authorizing a third party so as to allow cash withdrawal at an automated teller machine (ATM) by the third party on behalf of the account holder. However, embodiments described herein are not limited hereto. Instead of accessing a bank account, any other account or right, permission or access may be controlled by use of the embodiments described herein. For example, a right to enter a specific place, room or section of a building may be subject to the requirement of authorizing a third party. For example, a door may be opened for a specific third party on behalf of a responsible person and/or owner. As another example, access to accounts such as streaming accounts, information accounts for any other services provided by a service provider may be authorized to a third party on behalf of the owner. That is, embodiments related to any kind of right or permission or access that may be used by a third party on behalf of a responsible or authorized entity.

FIG. 1 shows a schematic block diagram of a method 1000 according to an embodiment. Method 1000 may be used for authorizing a third party.

Actions of method 1000 may be grouped into three groups 1100, 1200 and 1300 wherein such a group is used for a better understanding of the method but does not provide for a limitation of embodiments described herein. For example, actions of group 1100 may be executed at a first entity or device or apparatus. This first device may be accessed, used or operated by an authorized user or person or entity, e.g., an account holder. In 1110 a biometric feature of a third party is obtained. The biometric feature may be any biometric feature, e.g., a fingerprint, facial features or the like. The biometric feature may further relate to the biometric feature (fingerprint) itself or data derived thereof such as a fingerprint template, i.e., information extracted or derived from the biometric feature. Obtaining the biometric feature may comprise receiving the biometric feature through a wired or wireless communication channel from a distant other device, e.g., a device of the third party. Alternatively or in addition, 1110 may be performed by using an element, e.g., a sensor element, of the first entity, e.g., when the third party is present at the first entity.

At 1120 a secret value is obtained, e.g., a one-time password (OTP) or any other type of value being deemed to be secure, i.e., unknown to non-involved entities.

At 1130 the biometric feature and the secret value are combined so as to obtain a combined secret value. By way of example, the combined secret value may be understood as an encrypted version of the biometric feature. Method 1000 may comprise a step of deriving a key from the secret value and using the key to encrypt the biometric feature so as to obtain the combined secret value. That is, the OTP may be used directly or a further value to be used for the combination may be derived thereof.

Actions of group 1200 may be performed, for example, at an access controller, i.e., an entity that controls access to an account or permission. For example, the access controller may be a part of an ATM that decides whether to dispense money in response to a request. At 1210 the secret value is received. The access controller may also form part of a security system controlling access to a secured space, database or transaction platform. The secret value received in 1210 may be the same or equal or comparable secret value being obtained in 1120. For example, 1120 and 1210 may comprise receiving the same secret value from a same entity, e.g., a service provider. At 1220, the combined secret value is received, e.g., from the first entity by a direct or indirect communication. The combined secret value may be received at 1220 directly from the first entity or from the third party. That is, the combined secret value may be stored at a memory of the third party and/or may be known to the user.

At 1230, the combined secret value is processed using the secret value so as to obtain a decoded biometric feature. For example, the combined secret value may be decoded by use of the secret value so as to decode the biometric feature being encoded on 1130.

Actions of group 1300 may be executed, for example, at the first entity, the access controller and/or a different entity. Performing actions of group 1300 at the access controller may allow for a high security or safety as a transmission of sensitive data or information may be prevented. However, embodiments are not limited to executing actions of group 1300 at the access controller.

At 1310 a biometric feature to be verified is obtained. At 1320 the decoded biometric feature is compared with the biometric feature to be verified so as to obtain a comparison result. At 1330 the third party is authorized based on the comparison result.

According to an embodiment, when the decoded biometric feature matches the feature to be verified, then access is granted, e.g., cash is dispensed, access to a secured space. database or transaction platform This may include to allow withdrawal of cash limited only by the limits of the account but may also relate to a binary decision. For example, a request may be transmitted to the first entity, the request indicating a specific amount of money to be withdrawn. By generating the combined secret value and/or as an additional or separate message or signal, the request may be acknowledged and/or amended, e.g., a maximum value, a minimum value and/or the value to be dispensed may be set or amended. 1330 may allow the third party to access the account being managed or operated by the first entity within the boundaries being indicated by the additional signal.

Although actions of group 1100 are described to be executed at the first entity and actions of group 1200 are described to be executed at the access controller, this does not necessarily limit embodiments to have physically performed the calculations at this entity but also relates to have calculations being performed externally, e.g., using cloud computing services or the like. Such external or distributed calculations are, however, operated or managed on behalf of the first entity, the access controller respectively.

Figure 2:
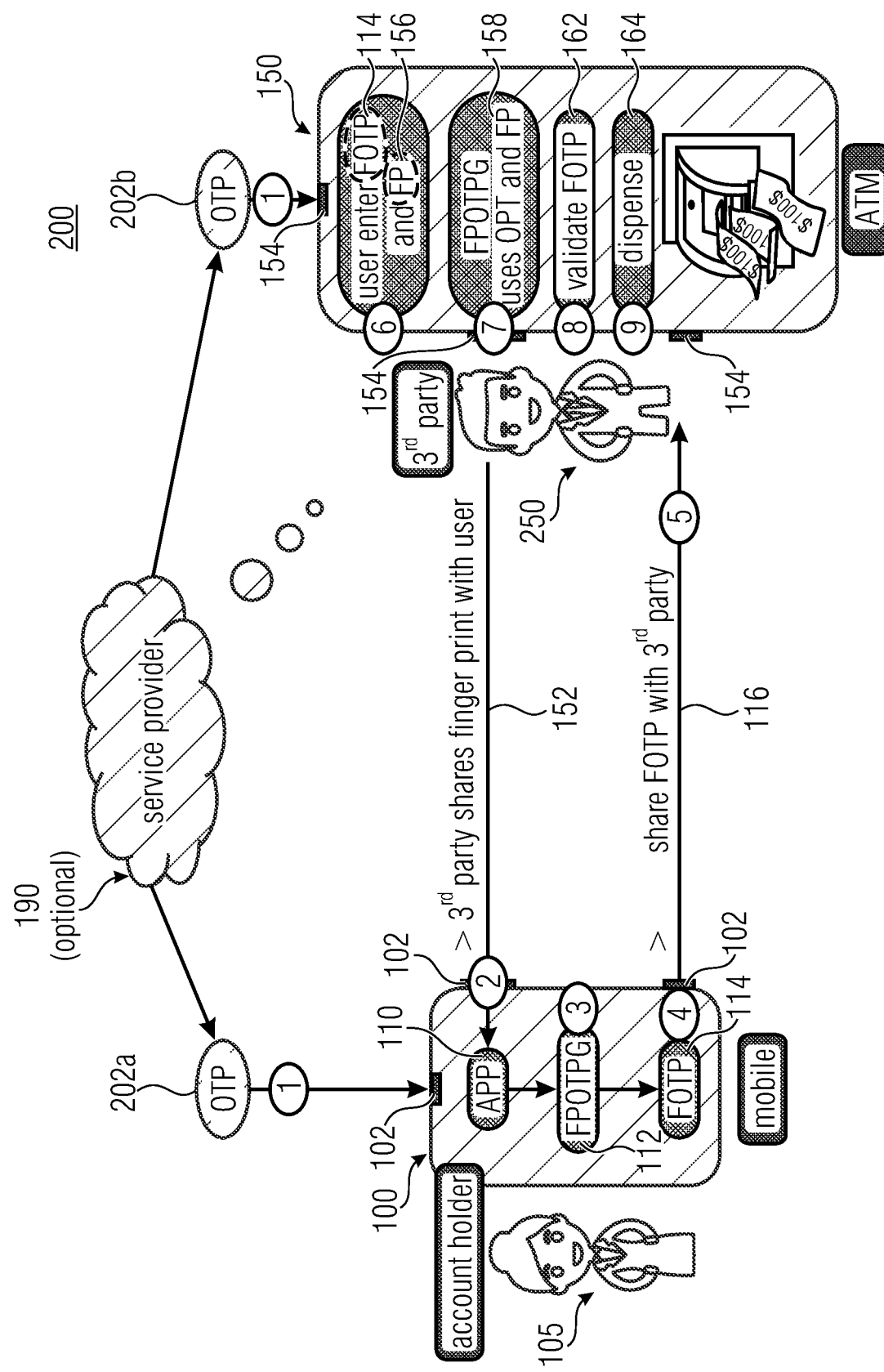
FIG. 2 shows a schematic block diagram of a system according to an embodiment.

FIG. 2 shows a schematic block diagram of a system 200 according to an embodiment. System 200 may comprise a device 100 being referred to as the first entity, e.g., a mobile device such as a smartphone, a telecomputer or the like. System 200 may further comprise a device 150 which may be referred to as an access controller forming at least a part of the device 150, e.g., device 150 is an ATM. System 200 may comprise an optional service provider 190. In the embodiment described relating to withdrawing cash from an account of an account holder 105 operating the first entity 100, the service provider 190 may provide services of a bank or the like. The service provider 190 may be considered as a supervising entity that provides the secret value to the first entity and the access controller. The service provider may provide a service to the first entity or a user thereof, the third party using the service on behalf of the first entity, the user thereof respectively. However, when considering services that may be executed without a supervising entity, e.g., data access or the like, the OTP may also be agreed on between the user 105 and the third party 250, for example.

The service provider 190 may provide for a one time password (OTP) 202*a* for the first entity 100 and an OTP 202*b* for the access controller 150. OTPs 202*a* and 202*b* may be the same OTP or secret value but may also differ from each other, e.g., based on different encryption or additional security mechanisms. Although referring, in this context, to an OTP, and although OTP allows for a high level of security, embodiments are not limited to an OTP. The secret values to be used may have unlimited or limited validity. A limited validity may be associated with, for example, a limited amount of time, a limited amount of usage or a specific location or the like.

The first entity 100 may comprise an interface 102 to receive signals and/or messages. Although the first entity 102 is described as comprising a single interface 102 only for receiving and transmitting signals or messages, the first entity 100 may comprise a plurality of such interfaces. The interface 102 may be a wired or wireless interface.

By use of interface 102 the OTP may be received at the first entity, thereby implementing, for example, 1120. Further a biometric feature of a third party 250 is received, for example, to implement 1110. The biometric feature may be received, for example, with a signal 152 comprising the biometric feature in plain text and/or encoded and/or by use of a local sensor, for example, to implement 1110. The OTP and the biometric feature may be received, for example, by a control unit 110 which may comprise, for example, a processor, a central processing unit (CPU), a microcontroller, a field programmable gate array (FPGA) or the like and/or a logic implementation of a control unit, e.g., an application (APP).

The OTP and the biometric feature may be provided to a calculation unit 112, e.g., a fingerprint OTP generator (FPOTPG) being configured for combining the biometric feature and the secret value so as to obtain a combined secret value 114, e.g., a fingerprint OTP (FOTP).

By providing the combined secret value 114, 1230 may be implemented. The first entity 100 may be configured for transmitting a signal 116 that comprises information indicating the combined secret value 114. Signal 116 may be transmitted to the access controller 150 and may be received at the access controller 150 through an interface 154. As described for interface 102, 154 may refer to a single interface or to a plurality of interfaces, commonly configured for transmitting and/or receiving signals.

At the access controller, the combined secret value may be received. For example, the third party or user may enter the secret value 114 by use of a peripheral device, e.g., a keyboard. Alternatively or in addition, the FOTP may be received by the access controller by use of a wired or wireless interface, for example, from the first entity or from a device of the third party. For example, the combined secret value 114 may be transmitted from the first entity 100 to the third party which then enters the combined secret value to the access controller. Alternatively or in addition, the combined secret value 114 may be transmitted on a different route indirectly to the access controller or directly to the access controller. Further, the biometric feature to be verified, e.g., the fingerprint of the third party, may be entered or provided to the access controller. As the third party is to be authenticated, the fingerprint 156 of the third party provided at this stage may be referred to as a biometric feature to be verified. For example, providing the fingerprint may form at least a part of 1310. At 158 an FPOTPG may use the OTP 202b and the biometric feature 156 to be verified (FP), e.g., to inversely decode the fingerprint being encrypted at the first entity 100 by use of the OTP. Therefore, a decoded biometric feature may be obtained. At 162 the access controller may validate the FOTP, e.g., when the decoded biometric feature matches the biometric feature to be verified. This allows to authorize the third party based on the comparison result, e.g., to implement 1330 and to dispense money at 164.

Figure 3:
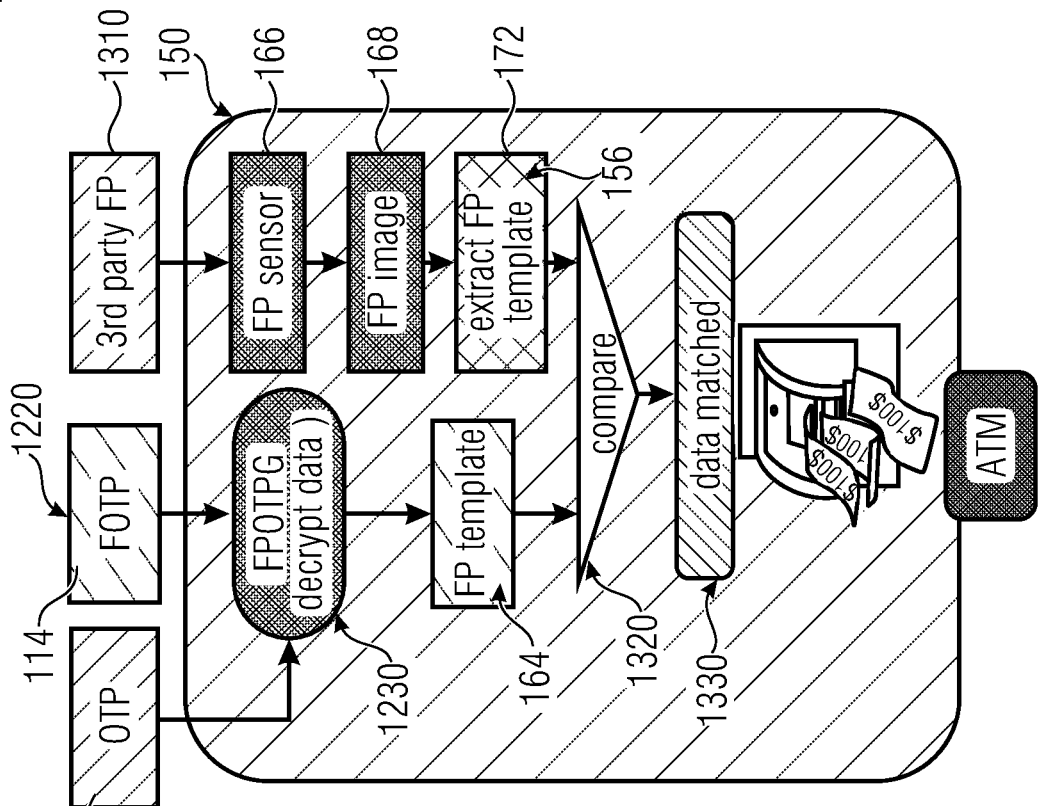
FIG. 3 shows a schematic diagram of a system according to an embodiment executing the method of FIG. 1
Figure 3:
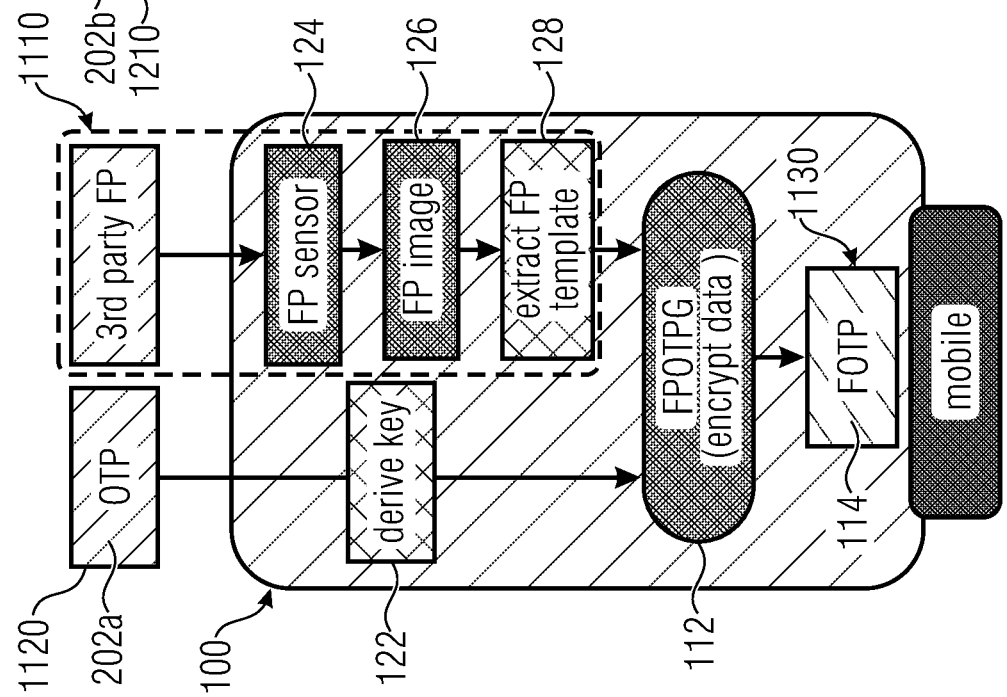

FIG. 3 shows a schematic diagram of system 200 executing method 1000. In this embodiment, actions of 1300 are executed at the access controller 150. The first entity 100 may comprise an optional key deriving unit 122 being configured for deriving a key, e.g., a cryptographic key, from the OTP being received at 1120.

1110 may, for example, comprise using a sensor element 124 of the first entity 100, e.g., a fingerprint sensor. A sensor control unit 126 may be configured for obtaining a fingerprint image from the fingerprint being sensed with the sensor element 124. A template extraction unit 128 may be configured for extracting a template from the biometric feature, e.g., a fingerprint template. That is, method 1000 may comprise extracting a template from the biometric feature and using the template as the biometric feature. The template being obtained by the template extraction unit 128 or the biometric feature itself may be provided to the FPOTPG being configured to encrypt data with the key deriving unit 122. Alternatively, the OTP may be used directly as a key provided to the calculation unit 112.

At the access controller 150, the OTP 202b and the FOTP or secret value 114 are decrypted, e.g., by executing 1230 so as to obtain the decoded biometric feature 164.

The access controller 150 may comprise a sensor element 166 which may be same or comparable or equal than sensor element 124. Further the obtained data may be processed according to the processing being obtained by the sensor control unit 126 in a sensor control unit 168 such that by extracting a template of the biometric feature 156 to be verified matches the decoded biometric feature 164 in a case where the biometric features correspond to each other or match each other. Based on comparing the biometric features or templates 164 and 156 authorizing 1330 may be obtained.

Although the access controller 150 is described as comprising sensor element 166 and the respective processing entities 168 to obtain the fingerprint image and 172 to obtain the template, one or more of those elements may be arranged at a device of the third party being in communication with the access controller 150. For example, the device of the third party, e.g., a mobile phone/smartphone or telecomputer, may comprise the sensor element 166. Optionally, the device may additionally comprise elements 168 and further optionally 172.

An apparatus for implementing the first entity and being in accordance with embodiments may thus comprise an input interface configured for obtaining a biometric feature of a third party, e.g., by use of sensor element 124 and/or by receiving signal 152. Further, the apparatus is configured for obtaining the secret value 102a, e.g., using the same or a different input interface. The apparatus may comprise a calculation unit 112 configured for combining the biometric feature and the secret value so as to obtain a combined secret value 114. The apparatus or a control unit thereof is configured for transmitting the combined secret value so as to authorize a person associated with the biometric feature.

As a possible complement to apparatus 100, an apparatus acting, for example, as a part of an access controller, may comprise an input interface, e.g., interface 154, for obtaining a secret value, e.g., secret value 102b, and for obtaining the combined secret value 114. With the same or a further interface information indicating a biometric feature may be received. Such an apparatus may comprise a calculation unit configured for processing the combined secret value using the secret value so as to obtain a decoded biometric feature 164. As described in connection with FIG. 3, this may relate to sensing the biometric feature by use of a sensor element or to receiving a signal that comprises respective information, e.g., a signal of a device of the third party. The calculation unit may be configured for comparing the decoded biometric feature with the biometric feature, the biometric feature to be verified respectively, so as to obtain a comparison result. A control unit is configured for authorizing a user of the apparatus, e.g., the third party, for a service provided by the apparatus based on the comparison result.

When referring again to FIG. 2, the access controller 150 may comprise or use a communication interface so as to transmit the biometric feature to a different apparatus, i.e., the first entity 100. That is, the third party may enter, for example, the biometric feature at the access controller 150 which then generates or transmits signal 152. Optionally, signal 152 may also be generated, triggered or forwarded by a device of the third party 250.

In system 200, the access controller 150 may be an ATM. Authorizing the third party based on the comparison result may lead to dispensing money at the ATM on behalf of the user 105 of the first entity 100 to the third party.

The access controller 150 may be configured for receiving the combined secret value 114, e.g., using signal 116, responsive to transmitting the biometric feature with signal 152 (including values derived thereof, e.g., templates) from the first entity 100. This may allow to consider reception of the combined secret value 114 as a kind of confirmation for the activity the third party requests. For example, metadata or additional information may be incorporated into signal 152 and/or transmitted by a different signal. This information may indicate, for example, a time, location, amount of access to be requested or the like. By generating signal 116, such a detailed request may be acknowledged or granted.

That is, the biometric feature may be transmitted from the access controller to the first entity, e.g., using signal 152, based on an input signal generated by the third party, e.g., a command provided to the access controller 150. The combined secret value 114 may be generated dependent on a confirmation generated by a user 105 of the first entity 100. Missing reception of the combined secret value 114, e.g., after a defined time has been lapsed, a time out respectively, or receiving a negative acknowledgement, may be interpreted as rejecting the request.

Figure 4:
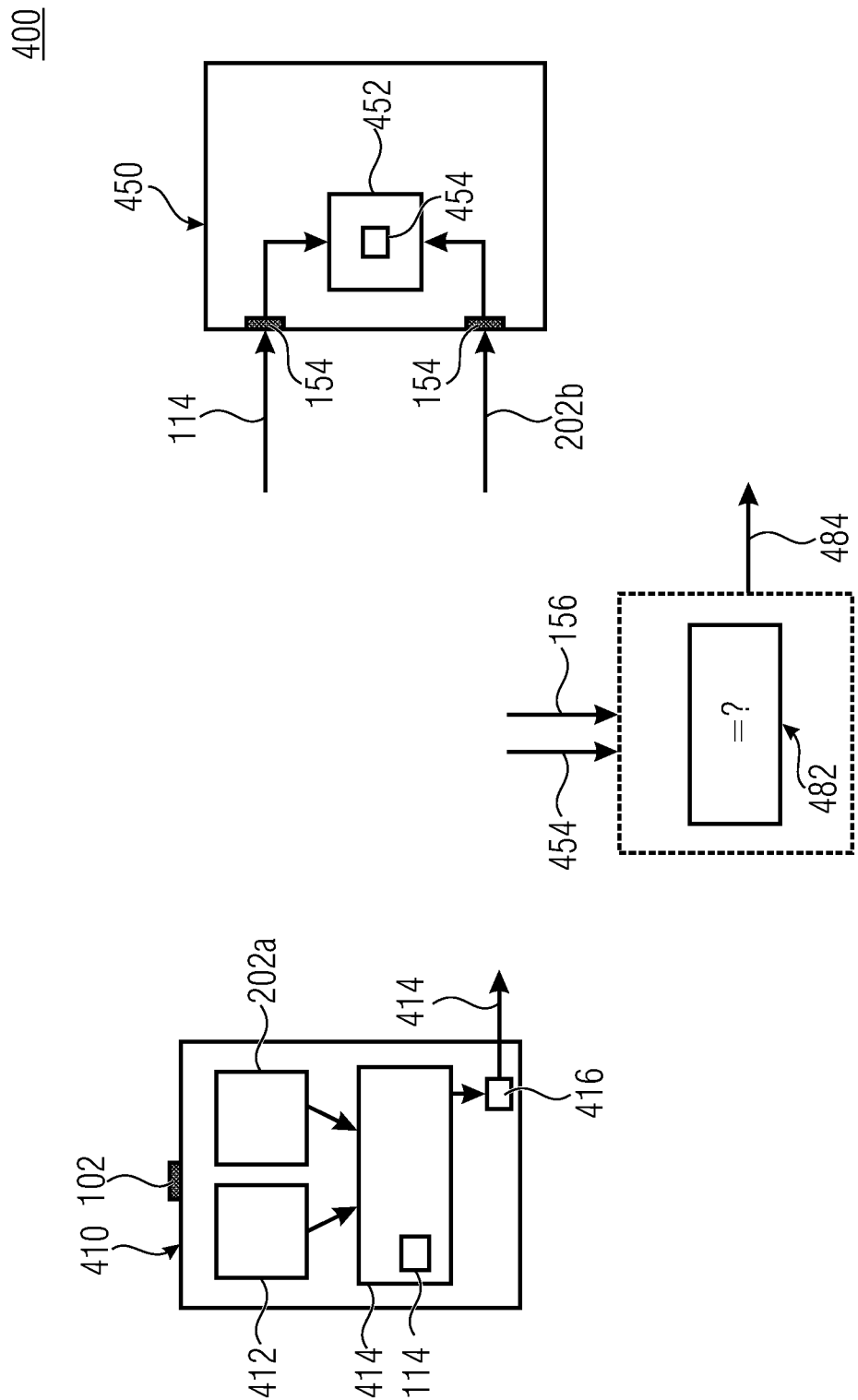
FIG. 4 shows a schematic block diagram of a system according to an embodiment, the system comprising a first entity according to an embodiment and an access controller according to an embodiment.

FIG. 4 shows a schematic block diagram of a system 400 according to an embodiment, system 400 comprising a first entity 410 according to an embodiment and an access controller 450 according to an embodiment.

The first entity 410 comprises the interface 102 being configured for receiving the secret value 202a. Further, the first entity 410 is configured for receiving the biometric feature, for example, by use of a biometric sensor of the first entity 410 or by receiving a respective signal such as signal 152. The first entity 410 may comprise a calculation unit 414 configured for using the biometric feature 412 and the secret value 202a to obtain the combined secret value 114. The first entity 410 may comprise a control unit 416 configured for transmitting the combined secret value 114 so as to authorize a person associated with the biometric feature 412, e.g., the third party.

The access controller 450 comprises an interface to receive the secret value 202b and the combined secret value 114. The access controller 450 comprises a calculation unit 452 configured for processing the combined secret value 114 using the secret value 202b so as to obtain a decoded biometric feature 454 as described, for example, for the decoded biometric feature 164. A processing or calculation unit 482 is configured to obtain, receive or calculate data representing the biometric feature 156 to be verified. The processing unit 482 is configured for comparing the decoded biometric feature 454 and the biometric feature 156 to be verified. The processing unit 482 or a control unit thereof may be configured for authorizing a user of the apparatus for a service provided by the apparatus based on the comparison result. According to an embodiment, the processing unit 482 is implemented or comprised by the access controller 450. For example, the calculation unit thereof may compare the decoded biometric feature 454 with the biometric feature 156 to be verified. An additional control unit may be configured for authorizing the user of the apparatus, e.g., the third party. A respective signal 484 may indicate a result of the comparison. Beside a binary decision if the third party is authorized or not to either dispense money or not, for example, an access may be restricted. For example, when referring again to data access, different levels of data (e.g., confidential and non-confidential) may be accessed based on the comparison result.

The comparison result may indicate a match between the biometric feature to be verified and the decoded biometric feature. In case of a match, the third party may be authorized for the access controller. In a case where the comparison result indicates a mismatch between the biometric feature to be verified and the decoded biometric feature, the third party may, thus, at least be restricted for the access controller or for the access to the service provided.

Figure 5:
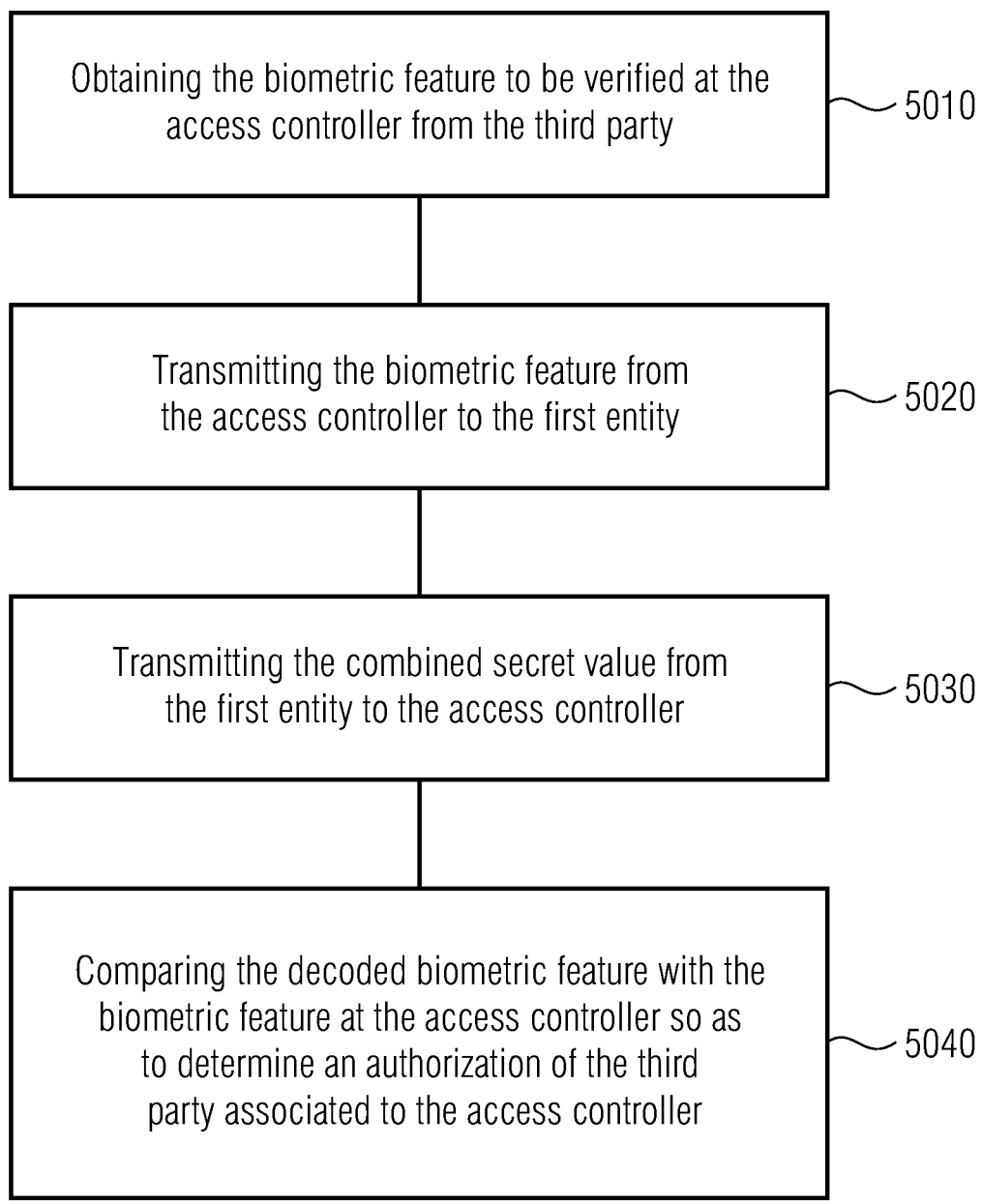
FIG. 5 shows a schematic flow chart of a method according to an embodiment, the method having actions that may be executed when executing the method of FIG. 1.

FIG. 5 shows a schematic flow chart of a method 5000 having actions that may be executed when executing method 1000. At 5010, the biometric feature to be verified is obtained at the access controller from the third party. For example, this may comprise using a sensor element of the access controller or receiving a signal comprising respective information at the access controller. That is, obtaining the biometric feature at the access controller may comprise sensing the biometric feature with a sensor of the access controller and/or receiving the biometric feature with the access controller using a communication channel and/or communication interface.

At 520, the biometric feature may be transmitted from the access controller to the first entity, for example, using signal 152 by which the third party shares the biometric feature with a user of the first entity, the first entity respectively. At 5030 the combined secret value is transmitted from the first entity to the access controller, for example, using signal 116. At 5040, the access controller may compare the decoded biometric feature with the biometric feature to be verified so as to determine an authorization of the third party associated to the access controller.

According to an embodiment, a method described herein, e.g., method 1000 and optionally additional steps, may form at least a part of one factor of an at least two-factor authorization. That is, the described authentication of the third party may be expanded by additional factors of the at least two-factor authorization, e.g., a two-factor authorization, a three-factor authorization or higher. For example, a first factor may be implemented by receiving the OTP or secret value, the combined secret value respectively, the second factor may be implemented by receiving and processing or providing the biometric feature. Such embodiments do not prevent a use of additional passwords or legitimization procedures performed so as to authorize the third party and/or user 105.

That is, embodiments allow to prevent issues arising for, e.g., cardless withdrawal, access given through an OTP only, due to which, if any person gets the OTP, this person will be able to withdraw the cash other than the assigned third party. Further, by enhancing the security when combining the secret value with the biometric feature, further attacks such as an SIM (subscriber identity module) swap fraud may hampered, and such attacks used to get the OTP easily when receiving messages being dedicated to the third party.

Embodiments may allow that only the authorized third party can withdraw the amount, i.e., if the OTP is shared or hacked by any individual without the fingerprint of the third party, the money cannot be withdrawn as the biometric feature misses. Embodiments may allow to increase security due to a two-factor authentication instead of a one-factor authentication.

Embodiments provide for simple implementations that allow for a high security at the same time. Embodiments may allow to transmit the biometric feature, the template thereof, to the first entity to generate the combined biometric feature, the combined secret value respectively. This combined biometric feature is transmitted to the third party, the access controller respectively. The combined biometric data and the biometric feature are entered by the third party at the access controller. Optionally, the combined biometric data is received from the first entity and the third party enters its biometric feature. According to an example, the third party may be physically present at the first entity when providing for the biometric feature. The first entity may collect the biometric feature and may generate the combined biometric feature, the combined secret value respectively and may share this value with the third party. The combined secret value and the biometric feature may be entered by the third party at the access controller. A device for such a concept is explained, for example, in connection with FIG. 3 where the first entity 100 comprises a respective sensor element 124. That is, the third party may share its biometric information through some communication media, e.g., using signal 152 and/or may provide its biometric data when being physically present so as to have the biometric feature being sensed at the first entity.

As the biometric feature, the sensor data may be used. Alternatively or in addition, information derived therefrom may be used, e.g., a so-called template. As a template one may understand a selection and categorization of key features or key parameters. When referring, for example, to a fingerprint, such parameters may be crossovers, cores, bifurcations, ridge-endings, islands, deltas and/or pores in the pattern of a fingerprint. That is, a method according to an embodiment may comprise extracting a template from the biometric feature and using the template as the biometric feature, as the information to be compared. As such, the template may be considered as being the biometric feature or may be considered as information being derived from the biometric feature. When comparing the functionality of embodiments with known concepts, some embodiments, e.g., system 200, rely on using a same secret value being used at the first entity and at the access controller. Another difference is that embodiments may provide for a transfer of a biometric feature or the providing of a biometric feature at a different device, e.g., at the first entity in addition to the access controller.

For example, deriving the template may comprise one or more of the following steps:

Step 1: Load the input fingerprint image, e.g., sensor data obtained.

Step 2: Perform normalization on the input fingerprint image to standardize the intensity values in the fingerprint image.

Step 3: Perform segmentation, e.g., using variants thresholding method on the normalized fingerprint image to separate between foreground region and background region.

Step 4: Enhance the fingerprint image, e.g., using a GABOR filter.

Step 5: After enhancement, convert the image into a binary image using, for example, a global threshold of zero method.

Step 6: Perform a thinning operation on the binary image to create a skeletonized version of the binary image.

Step 7: Extract minutiae from the thinned image using, e.g., a crossing number concept, and go to step 8 if input fingerprint image is processed for enrolment; otherwise go to step 9, if it is processed for identification.

Step 8: If the input fingerprint image is processed for enrolment, then enroll it into database.

Step 9: Use minutiae based algorithm to match input fingerprint image with all template images stored in the database; if matching is successful, then the fingerprint is identified, information may be displayed related to the matched fingerprint, otherwise it is not identified. A match may allow to authorize the third party.

The described steps show a possible example on how to process a fingerprint, on how to derive a template. However, embodiments are not limited hereto but also allow for a different processing or a different technique for deriving a template from a fingerprint or other biometric features.

Embodiments may provide for a two-factor authentication method for third party cardless cash withdrawal, i.e., using the third party fingerprint and a system-generated OTP. This may allow to solve/secure security issues. Embodiments may be implemented so as to make a presence of the third party to be authorized or the authorized third party and a fingerprint OTP (combined secret value) mandatory to withdraw the amount. This may prevent or solve security issues arising from the possibility that OTPs might be stolen. In such a case, the fingerprint may be missing at the access controller, therefore preventing harmful damages or losses when losing the OTP.

According to an embodiment, at the account holder, the account holder initiates the process. The account holder gets the OTP from the system and the fingerprint (FP) of the third party. Further, a key may be derived out of the OTP (i.e., OTP1). The fingerprint template may be extracted (i.e., FPT2) from the fingerprint being received. OTP1 and FPT2 data may be encrypted to generate fingerprint OTP (FOTP, combined secret value). The FOTP may be shared with the third party.

At the ATM or access controller, the third party may initiate the withdrawal process in the ATM. The third party may enter the FOTP caught from the account holder and gives same thumb fingerprint impression on machine. The machine may use a same or a comparable technique as used at the account holder to extract the RPT from the thumb impression entered on the machine and may generate the FP template (FPT1). The machine may use the OTP generated by the system and the FOTP to the decrypt the FP template (FPT2). The machine may compare FPT1 and FPT2, e.g., using a fingerprint algorithm. On success, the ATM may dispense the money, as it may reject to dispense.

When using a described embodiment as part of a two-factor authentication, this may mandate the presence of an authorized third party to do cardless cash withdrawal. Embodiments may allow to bind biometric data with an OTP to enhance the security. It can be a fingerprint or another biometric data, e.g., face ID or iris scan. Although embodiments may be relevant for third party cash withdrawals, it can be easily extended to other systems where only OTP is being used for authenticating a third party.

Embodiments may be implemented in view of operations/cryptography algorithms which may be performed, for example, at the account holder/first entity and the ATM/access controller. For example, when using a payment card that uses nearfield communication (NFC), the user can send the OTP and the fingerprint data to the card over an FC. The card can communicate the data and give the FOTP to the user via NFC. Same or comparable functionality may be generated, for example, on embedded secure elements.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A method for authorizing a third party, the method comprising:
   performing, at a first entity:
      obtaining a biometric feature of the third party;
      obtaining a secret value;
      combining the biometric feature and the secret value so as to obtain a combined secret value;
   performing, at an access controller:
      receiving the secret value; and
      receiving the combined secret value;
      processing the combined secret value using the secret value so as to obtain a decoded biometric feature;
   the method further comprising:
      obtaining a biometric feature to be verified;
      comparing the decoded biometric feature with the biometric feature to be verified so as to obtain a comparison result;
      authorizing the third party based on the comparison result;
      extracting a template from the biometric feature; and
      using the template as the biometric feature.

2. The method of claim 1, wherein the comparing the decoded biometric feature with the biometric feature is executed at the access controller.

3. The method of claim 1, wherein in a case where the comparison result indicates a match between the biometric feature and the decoded biometric feature, the third party is authorized by the access controller, and/or wherein in a case where the comparison result indicates a mismatch between the biometric feature and the decoded biometric feature, the third party is at least restricted by the access controller.

4. The method of claim 1, further comprising:
   deriving a key from the secret value at the first entity and using the key to encrypt the biometric feature so as to obtain the combined secret value.

5. The method of claim 1, wherein the first entity is related to an authorizing entity, the method further comprising:
   obtaining the biometric feature to be verified at the access controller from the third party;
   transmitting the biometric feature from the access controller to the first entity;
   transmitting the combined secret value from the first entity to the access controller or to the third party, to provide the combined secret value to the access controller; and
   comparing the decoded biometric feature with the biometric feature at the access controller so as to determine an authorization of the third party associated to the access controller.

6. The method of claim 5, wherein obtaining the biometric feature at the access controller comprises:
   sensing the biometric feature with a sensor of the access controller; and/or receiving the biometric feature with the access controller using a communication channel.

7. The method of claim 1, wherein the biometric feature is transmitted from the access controller to the first entity based on an input signal generated by the third party, and wherein the combined secret value is generated dependent on a confirmation generated by a user at the first entity.

8. The method of claim 1, wherein the access controller is an automated teller machine (ATM), and wherein based on authorizing the third party based on the comparison result, the method further comprises:
   dispensing money at the ATM on behalf of a user of the first entity to the third party.

9. The method of claim 1, wherein the secret value is provided to the first entity and the access controller by a supervising entity.

10. The method of claim 9, wherein the supervising entity is a service provider providing a service to the first entity or a user thereof, the third party using the service on behalf of the first entity or the user thereof.

11. A non-transitory computer readable digital storage medium having stored thereon a computer program having a program code for performing, when running on a computer, the method of claim 1.

12. A method for authorizing a third party, the method comprising:
  performing, at a first entity:
    obtaining a biometric feature of the third party;
    obtaining a secret value;
    combining the biometric feature and the secret value so as to obtain a combined secret value;
  performing, at an access controller:
    receiving the secret value; and
    receiving the combined secret value;
    processing the combined secret value using the secret value so as to obtain a decoded biometric feature;
  the method further comprising:
    obtaining a biometric feature to be verified;
    comparing the decoded biometric feature with the biometric feature to be verified so as to obtain a comparison result;
    authorizing the third party based on the comparison result; and
    deriving a key from the secret value at the first entity and using the key to encrypt the biometric feature so as to obtain the combined secret value.

* * * * *